United States Patent
Chung et al.

(10) Patent No.: US 9,847,541 B2
(45) Date of Patent: Dec. 19, 2017

(54) VOLTAGE SYNCHRONIZATION METHOD AND SYSTEM

(71) Applicants: Hyundai Motor Company, Seoul (KR); Kia Motors Corporation, Seoul (KR)

(72) Inventors: Sung Jin Chung, Gyeonggi-do (KR); Chang Seok Ryu, Gyeonggi-do (KR); Joon Yong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 516 days.

(21) Appl. No.: 14/450,539

(22) Filed: Aug. 4, 2014

(65) Prior Publication Data

US 2015/0188168 A1    Jul. 2, 2015

(51) Int. Cl.
| | |
|---|---|
| *H01M 8/04* | (2016.01) |
| *H01M 8/04537* | (2016.01) |
| *H01M 8/04858* | (2016.01) |
| *B60L 11/18* | (2006.01) |
| *B60L 3/00* | (2006.01) |
| *H01M 8/04992* | (2016.01) |

(52) U.S. Cl.
CPC ....... *H01M 8/04559* (2013.01); *B60L 3/0053* (2013.01); *B60L 11/1881* (2013.01); *B60L 11/1883* (2013.01); *B60L 11/1887* (2013.01); *H01M 8/0488* (2013.01); *H01M 8/04544* (2013.01); *H01M 8/04865* (2013.01); *H01M 8/04992* (2013.01); *B60L 2240/547* (2013.01); *B60L 2240/80* (2013.01); *B60L 2270/145* (2013.01); *H01M 2250/20* (2013.01); *Y02T 90/32* (2013.01); *Y02T 90/34* (2013.01)

(58) Field of Classification Search
None
See application file for complete search history.

(56) References Cited

U.S. PATENT DOCUMENTS

2008/0138680 A1*  6/2008 Hu ............... H01M 8/0494
                                                            429/431

FOREIGN PATENT DOCUMENTS

| JP | 2011-166923 | 8/2011 |
|---|---|---|
| JP | 2012-249414 | 12/2012 |
| KR | 10-2004-0001975 A | 1/2004 |
| KR | 10-2006-0112680 A | 11/2006 |
| KR | 10-2010-0026661 | 3/2010 |
| KR | 10-2010-0052417 A | 5/2010 |
| KR | 10-1028024 B1 | 4/2011 |

* cited by examiner

*Primary Examiner* — Jonathan Crepeau
(74) *Attorney, Agent, or Firm* — Mintz Levin Cohn Ferris Glovsky and Popeo, P.C.; Peter F. Corless

(57) ABSTRACT

A voltage synchronization method and system are provided. The system includes a main controller that is configured to determine whether voltage synchronization is possible. When the voltage synchronization is determined to be possible, the main controller is configured to transmit a voltage synchronization command to a plurality of auxiliary controllers. The plurality of auxiliary controllers are configured to adjust sensed voltages based on an output voltage of a fuel cell stack when the transmitted voltage synchronization command is received.

20 Claims, 4 Drawing Sheets

VOLTAGE SYNCHRONIZATION METHOD AND SYSTEM

CROSS REFERENCE TO RELATED APPLICATION

The present application claims priority to Korean Patent Application No. 10-2013-0167270, filed on Dec. 30, 2013, the entire contents of which is incorporated herein for all purposes by this reference.

BACKGROUND

Field of the Invention

The present invention relates, in general, to a voltage synchronization method and system, and, more particularly, to a voltage synchronization method and system which can synchronize voltage values by reducing differences between the voltage values that are respectively sensed by controllers.

Description of the Related Art

Voltage sensing controllers connected to a high-voltage line of a fuel cell vehicle (FCV) include a stack voltage monitoring device (SVM), a motor control unit (MCU), a power converter controller (PCC), a blower/pump control unit (BPCU), etc. When a fuel cell control unit (FCU) for overall operation of a FCV transmits a voltage command for the recovery of regenerative braking energy to a PCC, the PCC may be configured to store the energy in a high-voltage battery through power control in response to the voltage command. However, when the control voltage of the PPC is less than a voltage sensed by an MCU, the torque for regenerative braking is reduced due to a voltage upper limit constraint and the intended amount of energy may be not stored.

In addition, when a FCV slips back on a slope while starting from a stopped state, regenerative braking may occur as a motor rotates in the reverse direction. When the voltage sensed by the MCU is greater that the voltage of PCC by a specific offset value, the size of the voltage sensed by the MCU is increased by regenerative braking. When a maximum voltage value at which regenerative braking is no longer possible is reached, the motor is derated. The voltage value sensed by the MCU is decreased during the derating of the motor and increases due to subsequent regenerative braking and then deration occurs again. As these processes are repeated, the problem of the FCV being subjected to substantially heavy vibration occurs. This problem occurs due to the difference between the voltage sizes sensed by the PCC and the MCU in response to the voltage command that the FCU transmits to the PCC. To correct the different sizes of voltages, calibration is performed in consideration of errors in voltage sensors of the MCU and the PCC at the time of the development of the MCU and the PCC. However, voltage sensors designed for separate parts, such as the MCU and the PCC, have different errors. When the MCU and PCC are coupled to a high-voltage line, the voltage sizes sensed by the separate parts are different.

The foregoing is intended merely to aid in the understanding of the background of the present invention, and is not intended to mean that the present invention falls within the purview of the related art that is already known to those skilled in the art.

SUMMARY

Accordingly, the present invention provides a voltage synchronization method and system which may synchronize voltage values by reducing differences between the voltage values that are respectively sensed at controllers.

In particular, according to one aspect of the present invention, a voltage synchronization method may include: determining, at a main controller, whether voltage synchronization is possible; when the voltage synchronization is determined to be possible, transmitting, by the main controller, a voltage synchronization command to a plurality of auxiliary controllers; and correcting (e.g., adjusting or compensating for), by the plurality of auxiliary controllers, sensed voltages based on an output voltage of a fuel cell stack when the transmitted voltage synchronization command is received. According to an exemplary embodiment of the present invention, the process of determining whether the voltage synchronization is possible may include determining whether a change rate of the output voltage of the fuel cell stack and the voltages sensed by the plurality of auxiliary controllers is lower than a predetermined change rate.

The process of determining whether the voltage synchronization is possible may include determining that the voltage synchronization is possible when the change rate of the output voltage and the sensed voltages is less than the predetermined change rate. In addition, the determination whether the voltage synchronization is possible may include determining whether a communication state between the main controller and the plurality of auxiliary controllers is normal for a purpose of the voltage synchronization. The process may further include determining that the voltage synchronization is possible when the communication state between the main controller and the plurality of auxiliary controllers is determined to be normal.

The voltage synchronization method may further include determining, at the main controller, whether transmitting the voltage synchronization command to the plurality of auxiliary controllers is maintained for a first set time period. When transmitting the voltage synchronization command to the plurality of auxiliary controllers is maintained for at least the first set time period, the procedure performed at the main controller may be interrupted. The determination of whether the voltage synchronization is possible may be performed with highest priority for at least a second preset time by the main controller. The process of correcting the sensed voltages, by the plurality of auxiliary controllers, may include determining whether receiving the transmitted voltage synchronization command is maintained for a third set time period at each of the plurality of auxiliary controllers.

The voltage synchronization method may further include determining, by the main controller, whether transmitting the voltage synchronization command to the plurality of auxiliary controller sis maintained for a first set time period, the third set time period being shorter than the first set time period. The process of correcting the sensed voltages, by the plurality of auxiliary controllers, may include determining a range of correction for the voltages sensed by the plurality of auxiliary controllers when receiving the transmitted voltage synchronization command is maintained for the third set time period. In addition, the process of correcting the sensed voltages, by the plurality of auxiliary controllers, may further include correcting the sensed voltages within the determined range of correction based on the output voltage of the fuel cell stack.

Furthermore, according to another aspect of the present invention, a voltage synchronization system may include a main controller configured to determine whether voltage synchronization is possible; and a plurality of auxiliary controllers configured to receive a voltage synchronization command transmitted from the main controller as a result of determination that the voltage synchronization is possible, and correct voltages sensed by the plurality of auxiliary controllers based on an output voltage of a fuel cell stack.

According to an exemplary embodiment of the present invention, the main controller may include a voltage synchronizable state determining section configured to determine whether a change rate of the output voltage of the fuel cell stack and the voltages sensed by the plurality of auxiliary controllers is less than a predetermined change rate. The voltage synchronizable state determining section may be configured to determine that the voltage synchronization is possible when the change rate of the output voltage and the sensed voltages is less than the predetermined change rate.

The main controller may include a voltage synchronization-intended system failure diagnosis section configured to determine whether a communication state between the main controller and the plurality of auxiliary controllers is normal for a purpose of the voltage synchronization. The main controller may be configured to interrupt the operation when transmitting the voltage synchronization command to the plurality of auxiliary controllers is maintained for a first set time period. The main controller may be configured to perform a determination on whether the voltage synchronization is possible with highest priority for at least a second set time period.

Each of the plurality of auxiliary controllers may be configured to determine whether receiving the transmitted voltage synchronization command is maintained for a third set time period. Each of the plurality of auxiliary controllers may include a voltage correction range determining section configured to determine a range of correction of the voltages sensed by a corresponding auxiliary controller of the plurality of auxiliary controllers; and a voltage correction execution section configured to perform a voltage correction within the determined range of correction based on the output voltage of the fuel cell stack.

According to exemplary embodiments of the present invention, the voltage synchronization method and system may improve the regenerative braking performance of a fuel cell vehicle (FCV). Accordingly, the fuel efficiency of the FCV may also be improved. In addition, it may be possible to reduce control failures by reducing variations between high-voltage controllers connected to a high-voltage line. For instance, it may be possible to prevent the vehicle from vibrating which would otherwise be caused by repetitive derating and regenerative braking depending on a voltage sensed by a motor controller (MCU) when the vehicle slips (e.g., rolls backward on a slope) back on a slope.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
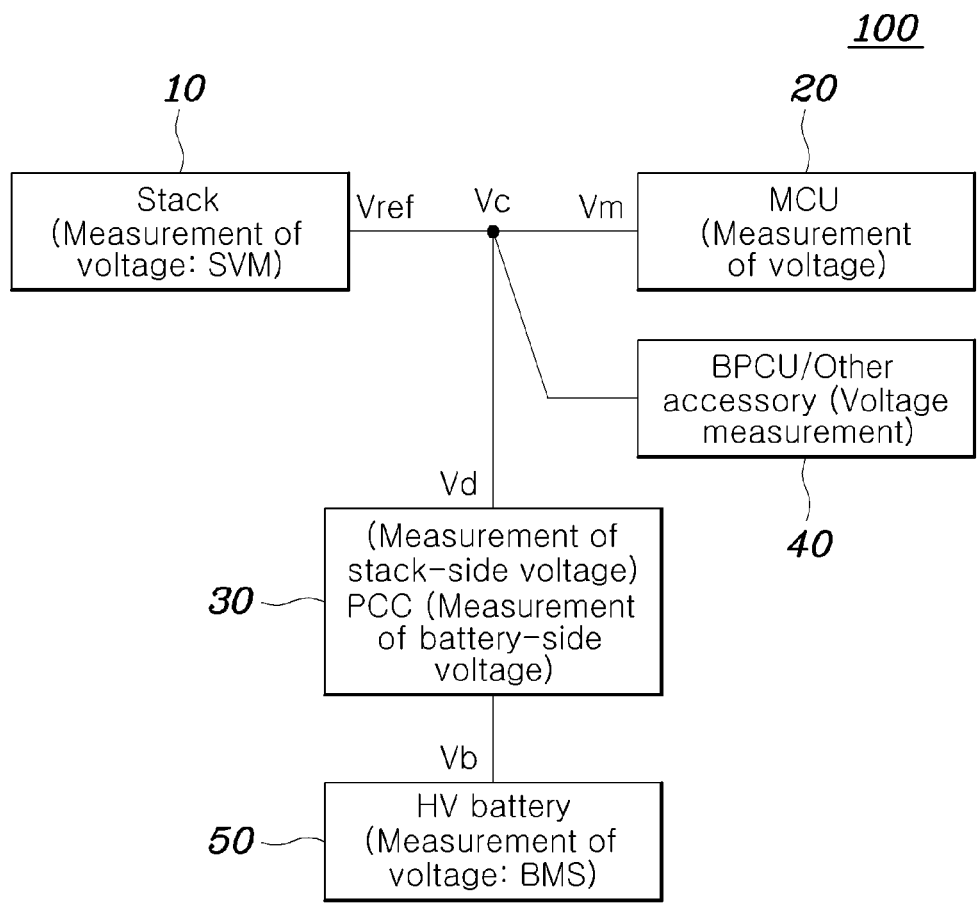
FIG. 1 is an exemplary configuration view of a high-voltage power network of a fuel cell vehicle (FCV) according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinbelow, exemplary embodiments of the present invention will be described in detail with reference to the accompanying drawings. Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the exemplary embodiments of the present invention are disclosed only for illustrative purposes and should not be construed as limiting the present invention.

Reference will now be made in detail to various exemplary embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element. It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinbelow, exemplary embodiments of the present invention will be described in detail with reference to the accompanying drawings. Throughout the drawings, the same reference numerals will refer to the same or like parts.

FIG. 1 is an exemplary configuration view of a high-voltage power network of a fuel cell vehicle (FCV) according to an exemplary embodiment of the present invention. The high-voltage power network 100 of an FCV according to this exemplary embodiment may include a fuel cell stack 10, a motor control unit (MCU) 20, a power converter controller (PCC) 30, a blower/pump control unit (BPCU) 40 and a high-voltage battery 50. The output voltage of the fuel cell stack 10 may be sensed by a stack voltage monitoring device (SVM). The MCU 20 may include a voltage sensor configured to sense an input voltage. The PCC 30 may be a controller within a high-voltage direct current (DC) converter, and may be configured to sense a voltage of a terminal connected to the fuel cell stack 10 and a voltage of a terminal connected to the high-voltage battery 50. The blower/pump control unit 40 may be configured to sense a voltage induced to a blower/pump, and each of other accessories may also have a voltage sensor configured to sense a voltage induced to the corresponding accessory.

Furthermore, an output voltage Vref of the fuel cell stack 10, a voltage sensed by the MCU 20, and a voltage of a terminal of the PCC 30 at a side of the fuel cell stack 10 may be about equal to a voltage Vc of a node to which the high-voltage lines are connected. However, in practice, the voltages may not be sensed to be equal since each of the SVM within the fuel cell stack 10, the voltage sensor of the MCU 20, the PCC 30, etc. may have a substantially small error. The sensed voltages may be synchronized at a specific point of time and a specific level to allow individual controllers to sense a substantially identical voltage to improve the precision of operation over separate parts of the controllers while the FCV is running. The value of the voltage sensed by the SVM that has the highest precision of voltage sensing may be used as a reference voltage from among the sensed voltages, and the voltages sensed by the other controllers may be synchronized with the reference voltage.

Figure 2:
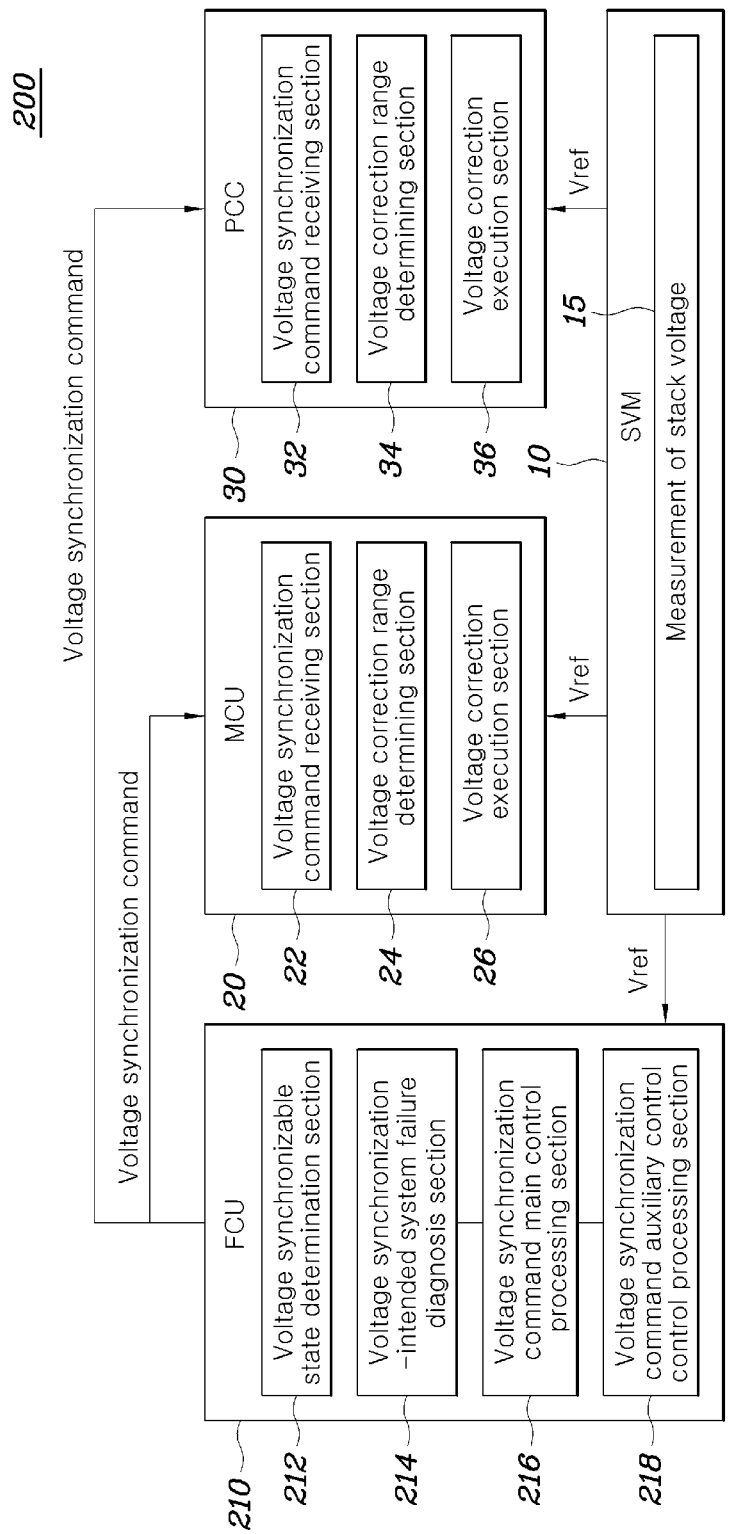
FIG. 2 is an exemplary block diagram showing the configuration of a voltage synchronization system according to an exemplary embodiment of the present invention.

FIG. 2 is an exemplary block diagram showing the configuration of a voltage synchronization system according to an exemplary embodiment of the present invention. The voltage synchronization system 200 according to this exemplary embodiment generally may include a fuel cell control unit (FCU) 210, an SVM 15 of the fuel cell stack 10, an MCU 20 and a PCC 30. A voltage value Vref sensed by the SMV 15 of the fuel cell stack 10 may be transferred to the FCU 210, MCU 20 and PCC 30.

The FCU 210 may be a main controller, and the MCU 20 and the PCC 30 may be auxiliary controllers. The FCU 210 may include a voltage synchronizable state determination section 212, a voltage synchronization-intended system failure diagnosis section 214, a voltage synchronization command main control processing section 216, and a voltage synchronization command auxiliary control processing section 218. The main controller may be configured to determine whether voltage synchronization is possible.

The voltage synchronizable state determination section 212 may be configured to determine that the voltage of the MCU 20 and the voltage of the PCC 30 may be synchronized with the output voltage Vref based on whether the FCV is in a drivable stable, (i.e. a drive (D) or reverse (R) gear is selected and an accelerator pedal is not depressed, that is, not engaged), whether the FCV is in a start/stop driving state, (i.e. not in an idle stop state, while the power of the fuel cell stack 10 may be used), whether the FCV is in an almost stopped state, (i.e. the driving speed of the FCV is less than a predetermined value), or whether the output voltage Vref of the fuel cell stack 10 is within a specific range. In other words, the voltage synchronizable state determination section 212 may be configured to determine whether a change rate of each of the output voltage of the fuel cell stack and the voltages sensed by the auxiliary controllers is less than a predetermined change rate. When a voltage to be sensed includes a substantial amount of a transitional period, voltage synchronization may not be possible at a substantially high voltage change rate per hour. The predetermined change rate may be previously set to a change rate at which the voltage synchronization may be determined to be possible at the change of voltage per hour of the sensed voltage. In the idle stop state, the stack voltage Vref may not be measured normally since the supply of fuel is stopped. The voltage synchronization-intended system failure diagnosis section 214 may be configured to determine whether a system for voltage synchronization is normal based on whether a controller area network (CAN) communication with the SVM 15 is normal, whether a gearing is normal, (i.e. a failure signal with regard to the operation of a vehicle is received from a shift lever), or whether a CAN communication with the MCU 20 and the PCC 30 which are voltage-synchronization targets is normal. In other words, the voltage synchronization-intended system failure diagnosis section 214 may be configured to determine that the system used for voltage synchronization is normal when the CAN communication between the FCU 210 and the SVM 15, between FCU 210 and the MCU 20 and between the FCU 210 and the PCC 30 is normal and no failure signals are received from gear devices used for the driving of the vehicle. That is, the normal operations of the various devices exist when a failure is not detected.

When the voltage synchronizable state determination section 212 determines that the voltage synchronization is possible and the voltage synchronization-intended system failure diagnosis section 214 determines that the voltage synchronization system is normal, the voltage synchronization command main control processing section 216 may be configured to synchronize the voltage sensed at the MCU 20 and the voltage sensed at the PCC 30 with the voltage sensed at the SVM 15. Specifically, the voltage synchronization command main control processing section 216 may be configured to transmit a voltage synchronization command to the MCU 20 and the PCC 30, and continuously transmit the voltage synchronization command for a first set time T1. When the transmission of the voltage synchronization command is maintained for the first set time T1, the voltage synchronization command main control processing section 216 may be configured to terminate voltage synchronization control without performing synchronization control until the starting of the FCV is terminated. The voltage synchronization control that is terminated may be the voltage synchronization control at the side of the main controller.

While the main controller continuously transmits the voltage synchronization to the auxiliary controllers for the first set time or longer, the auxiliary controllers may be configured to perform the voltage synchronization control in response to the voltage synchronization command transmitted from the main controller since it may be unnecessary to continuously synchronize the voltages of the MCU 20, the PCC 30, etc. while the vehicle is being driven. The voltage synchronization command main control processing section 216 may be configured to transmit the voltage synchronization command when the transmission of the voltage synchronization command is not maintained for the first set time T1.

The voltage synchronization command auxiliary control processing section 218 may have a voltage synchronizable state determination time during a second set time T2 after the FCV started before the voltage synchronization command of the voltage synchronization command main control processing section 216 is set on. In particular, when a time elapsed after the FCV started is less than the second set time T2, an idle stop function may be interrupted from being performed. When the time elapsed after the FCV started is about equal to or greater than the second set time T2, the idle stop function may be performed even when the voltage synchronizable state determination is not completed, and concurrently, subsequent voltage synchronization control may be performed. The idle stop function is an example embodied according to the present invention, and means that the voltage synchronizable state determination may be performed in priority to any other functions within the second set time T2 (other function control restricted time period).

For instance, depending on driving conditions, the idle stop function may be performed directly after the start of the FCV. In particular, the voltage synchronizable state determination section 212 may determine that the voltage synchronization is not possible. Therefore, a minimum amount of a control treatment priority time may be determined when the voltage synchronizable state is to be determined. When the elapsed time Time2 after the start is less than the second set time T2, the voltage synchronizable state determination may be performed independently. When the elapsed time Time2 after the start is about equal to or greater than the second set time T2, a voltage synchronization control logic, including the voltage synchronizable state determination, the voltage synchronization-intended system failure diagnosis, the voltage synchronization command transmission, etc., may be performed concurrently with the idle stop function.

When the voltage synchronization command is transmitted from the FCU 210 to the MCU 20 and the PCC 30, voltage synchronization command receiving sections 22 and 32 respectively included within the MCU 20 and the PCC 30 may be configured to receive the voltage synchronization command, and determine whether the voltage synchronization command is continuously received for a third set time T3 which may be set separately in the MCU 20 and the PCC 30. When the voltage synchronization command is received continuously for the third set time or greater from the FCU 210, voltage correction execution sections 26 and 36 within the MCU 20 and the PCC 30 may be configured to correct (e.g., adjust or compensate for) the voltages sensed at the MCU 20 and the PCC 30 based on the output voltage Vref transmitted from the SVM 15. The sensed voltages may be corrected based on an offset adjustment upper limit and an offset adjustment lower limit set by voltage correction range determining sections 24 and 34.

Figure 3:
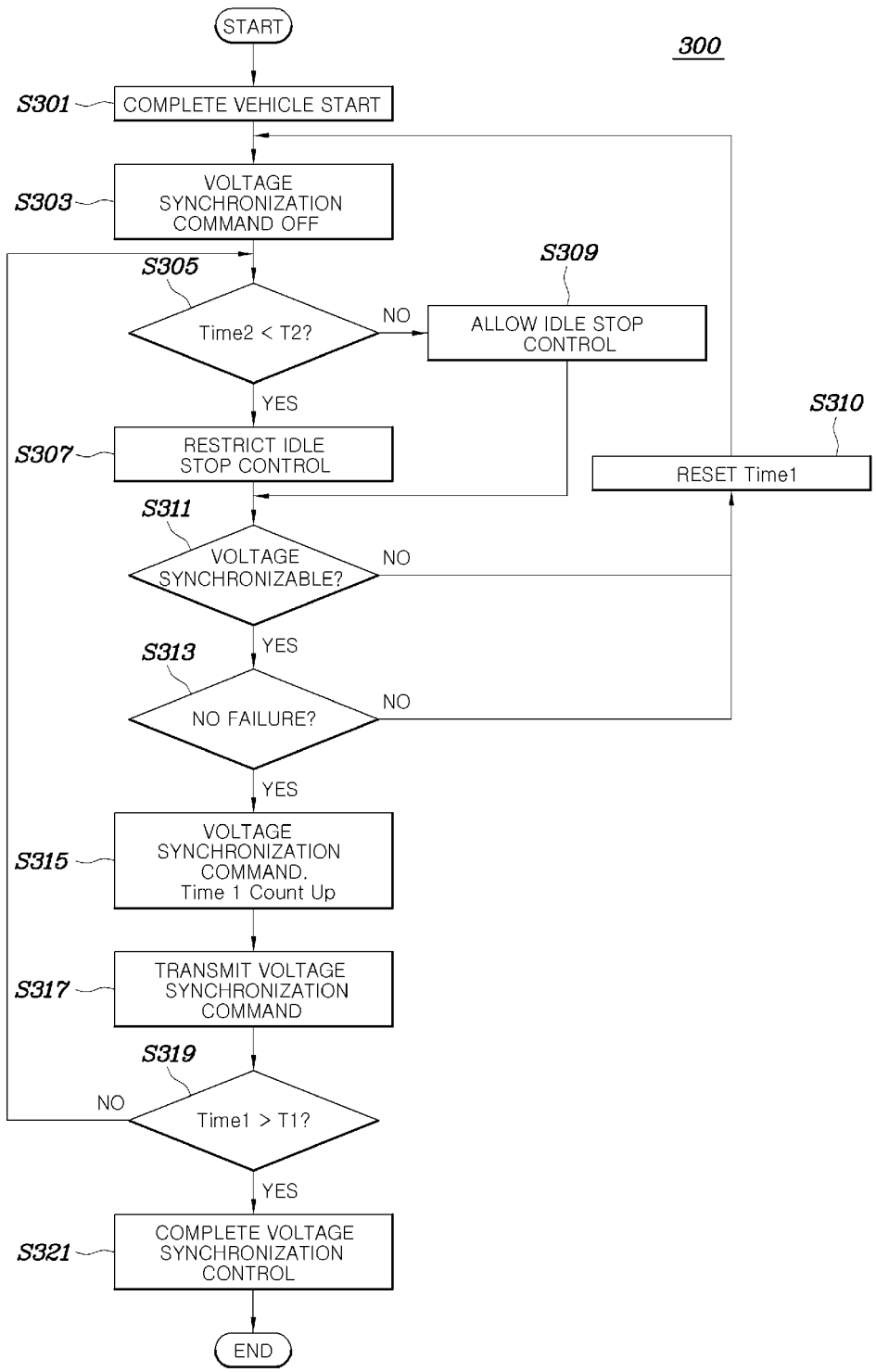
FIG. 3 and FIG. 4 are exemplary flowcharts showing a voltage synchronization method according to an exemplary embodiment of the present invention.
Figure 4:
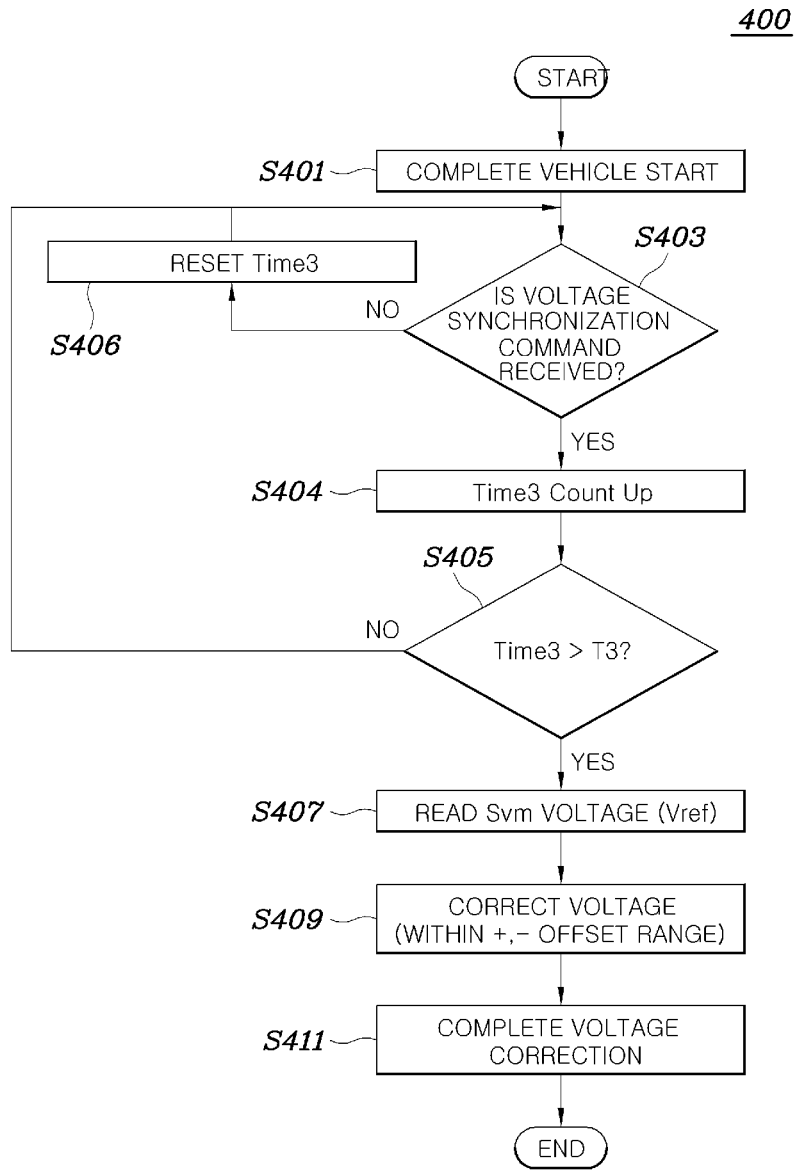

FIG. 3 and FIG. 4 are exemplary flowcharts showing a voltage synchronization method according to an exemplary embodiment of the present invention. FIG. 3 shows the voltage synchronization method at the FCU 210, and FIG. 4 shows the voltage synchronization method at the PCC 30.

At S303, the voltage synchronization command auxiliary control processing section 218 of the FCU 210 may have a voltage synchronizable state determination time during the second set time T2 after the start of the FCV before the voltage synchronization command of the voltage synchronization command main control processing section 216 is set on, i.e. when the voltage synchronization command is off. Specifically, at S301, the FCU may be started, and then at S305, the elapsed time Time2 after the completion of the start may be compared with the second set time. When the elapsed time Time2 after the completion of the start is less than the second set time T2, at S307, the idle stop control may be restricted (e.g., prevent) to prevent the idle stop control from being performed before the set time T2. When the elapsed time Time2 after the completion of the start is about equal to or greater than the second set time T2, at S309, the idle stop function may be performed even when the voltage synchronizable state determination is not completed, and concurrently, subsequent voltage synchronization control may be performed. The idle stop function is an example embodied according to the present invention, and means that the voltage synchronizable state determination may be performed in priority to other functions within the second set time T2 (e.g., other function control restricted time period).

For instance, depending on driving conditions, the idle stop function may be performed directly after the start of the FCV. In particular, the voltage synchronizable state determination section 212 may determine that the voltage synchronization is not possible. Therefore, a minimum amount of a control treatment priority time may be determined when the voltage synchronizable state is to be determined. When the elapsed time Time2 after the start is less than the second set time T2, the voltage synchronizable state determination may be performed independently. When the elapsed time Time2 after the start is about equal to or greater than the second set time T2, a voltage synchronization control logic, including voltage synchronizable state determination at S311, voltage synchronization-intended system failure diagnosis at S313, voltage synchronization command transmission at 317, etc., may be performed concurrently with the idle stop function.

After the second set time has elapsed after the completion of the start, at S311, the voltage synchronizable state determination section 212 of the FCU 210 may be configured to determine that the voltage of the MCU 20 and the voltage of the PCC 30 may be synchronized with the output voltage Vref based on whether the FCV is in a drivable stable, (i.e. a drive (D) or reverse (R) gear is selected and an accelerator pedal is not depressed, that is, engaged), whether the FCV is in a start/stop driving state, (i.e. not in an idle stop state), while the power of the fuel cell stack 10 may be used, whether the FCV is in an almost stopped state, (i.e. the driving speed of the FCV is less than a predetermined value), or whether the output voltage Vref of the fuel cell stack 10 is within a specific range. In the idle stop state, the supply of fuel may be stopped. When the voltage synchronization is determined to be possible, at S313, the voltage synchronization-intended system failure diagnosis section 214 may be configured to determine whether a system for voltage synchronization is normal based on whether a controller area network (CAN) communication with the SVM 15 is normal, whether a gear system is normal, (i.e. a failure signal with regard to the operation of a vehicle is received from a shift lever), or whether a CAN communication with the MCU 20 and the PCC 30 which are voltage-synchronization targets is normal.

In other words, the voltage synchronization-intended system failure diagnosis section 214 may be configured to determine that the system used for voltage synchronization is normal when the CAN communication between the FCU 210 and the SVM 15, between FCU 210 and the MCU 20 and between the FCU 210 and the PCC 30 is normal and no failure signals are received from gear devices used for the driving of the vehicle. When the system used for voltage synchronization is determined to be normal, at S315, the voltage synchronization command main control processing section 216 may be configured to transmit (e.g., set on) the voltage synchronization command and count from the point of time when the voltage synchronization command starts to be transmitted. In addition, at S319, the voltage synchronization command main control processing section 216 may be configured to transmit the voltage synchronization command to the MCU 20, the PCC 30, etc.

When the voltage synchronization is determined to be impossible (e.g., when synchronization is not possible) or the system used for voltage synchronization is determined to be not normal (e.g., abnormal or experiencing failure), the voltage synchronization command main control processing section 216 may be configured to reset the time Time1 when the voltage synchronization command which will be described below is transmitted and maintained at S310, and set off (e.g., not transmit) the voltage synchronization command at S303.

The voltage synchronization command main control processing section 216 may be configured to determine whether the transmission of the voltage synchronization command is maintained for the first set time T1 at S319. When the transmission of the voltage synchronization command is maintained for the first set time T1, at S321, the voltage synchronization command main control processing section 216 may be configured to terminate the voltage synchronization control without performing the synchronization control until the start of the FCV is completed since it may unnecessary to continuously synchronize the voltage of the MCU 20, the PCC 30, etc. while the vehicle is being driven. The voltage synchronization command main control processing section 216 may be configured to set off the voltage synchronization command when the transmission of the voltage synchronization command is not maintained for the first set time T1. Time1 shown in the figure indicates the time when the transmission of the voltage synchronization command is maintained.

At S401, the FCV may be started, and then at S403, the voltage synchronization command receiving sections 22 and 32, respectively included within the MCU 20 and the PCC 30, may be configured to determine whether the voltage synchronization command is received from the FCU 210. When the voltage synchronization command is received from the FCU 210, the time Time3 when the voltage synchronization command is received and maintained in the MCU 20 and the PCC 30 may be counted at S404, and whether the voltage synchronization command is continuously received for the third set time T3 set separately in the MCU 20 and the PCC 30 may be determined at S405.

Additionally, when the voltage synchronization command is not received from the FCU 210, the time Time3 when the voltage synchronization command is received and maintained may be reset at S406. When the voltage synchronization command is continuously received for the third set time T3 or greater from the FCU 210, the voltage correction execution sections 26 and 36 within the MCU 20 and the PCC 30 may be configured to read the voltage Vref transmitted from the SVM 15 at S407, and correct the voltages sensed at the MCU 20 and the PCC 30 at S709. At S411, the voltage correction may be completed based on an offset adjustment upper limit and an offset adjustment lower limit set by the voltage correction range determining sections 24 and 34.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A voltage synchronization method, comprising:
   determining, by a main controller, whether voltage synchronization is possible;
   transmitting, by the main controller, a voltage synchronization command to a plurality of auxiliary controllers when the voltage synchronization is determined to be possible; and
   adjusting, by the plurality of auxiliary controllers, sensed input voltages measured by a voltage sensor of each of the auxiliary controllers based on an output voltage of a fuel cell stack when the transmitted voltage synchronization command is received, wherein the auxiliary controllers include a motor control unit, a power converter controller, and at least one blower/pump/accessory control unit.

2. The voltage synchronization method according to claim 1, wherein the determination of whether the voltage synchronization is possible includes:
   determining, by the main controller, whether a change rate of the output voltage of the fuel cell stack and the voltages sensed by the plurality of auxiliary controllers is less than a predetermined change rate.

3. The voltage synchronization method according to claim 2, wherein the determination of whether the voltage synchronization is possible includes:
   determining, by the main controller, that the voltage synchronization is possible when the change rate of the output voltage and the sensed voltages is less than the predetermined change rate.

4. The voltage synchronization method according to claim 1, wherein the determination of whether the voltage synchronization is possible includes:
  determining, by the main controller, whether a communication state between the main controller and the plurality of auxiliary controllers is normal for a purpose of the voltage synchronization.

5. The voltage synchronization method according to claim 4, wherein the determination of whether the voltage synchronization is possible includes:
  determining, by the main controller, that the voltage synchronization is possible when the communication state between the main controller and the plurality of auxiliary controllers is determined to be normal.

6. The voltage synchronization method according to claim 1, further comprising:
  determining, by the main controller, whether transmitting the voltage synchronization command to the plurality of auxiliary controllers is maintained for a first set time.

7. The voltage synchronization method according to claim 6, further comprising:
  interrupting, by the main controller, the transmitting when transmitting the voltage synchronization command to the plurality of auxiliary controllers is maintained for at least the first set time.

8. The voltage synchronization method according to claim 1, wherein the determination of whether the voltage synchronization is possible is performed with a highest priority for at least a second preset time by the main controller.

9. The voltage synchronization method according to claim 1, wherein the adjustment of the sensed voltages includes:
  determining, by the main controller, whether receiving the transmitted voltage synchronization command is maintained for a third set time at each of the plurality of auxiliary controllers.

10. The voltage synchronization method according to claim 9, further comprising:
  determining, by the main controller, whether transmitting the voltage synchronization command to the plurality of auxiliary controllers is maintained for a first set time, the third set time being less than the first set time.

11. The voltage synchronization method according to claim 9, wherein the adjustment of the sensed voltages includes:
  determining, by the main controller, a range of correction for the voltages sensed by the plurality of auxiliary controllers when receiving the transmitted voltage synchronization command is maintained for the third set time.

12. The voltage synchronization method according to claim 11, wherein the adjustment of the sensed voltages includes:
  adjusting, by the plurality of auxiliary controllers, the sensed voltages within the determined range of correction based on the output voltage of the fuel cell stack.

13. A voltage synchronization system comprising:
  a main controller programmed to determine whether voltage synchronization is possible; and
  a plurality of auxiliary controllers programmed to receive a voltage synchronization command transmitted from the main controller as a result of determination that the voltage synchronization is possible, and adjust sensed input voltages measured by a voltage sensor of each of the auxiliary controllers based on an output voltage of a fuel cell stack, wherein the auxiliary controllers include a motor control unit, a power converter controller, and at least one blower/pump/accessory control unit.

14. The voltage synchronization system according to claim 13, wherein the main controller is further programmed to:
  determine whether a change rate of the output voltage of the fuel cell stack and the voltages sensed by the plurality of auxiliary controllers is less than a predetermined change rate.

15. The voltage synchronization system according to claim 14, wherein the main controller is further programmed to:
  determine that the voltage synchronization is possible when the change rate of the output voltage and the sensed voltages is less than the predetermined change rate.

16. The voltage synchronization system according to claim 13, wherein the main controller is further configured to:
  determine whether a communication state between the main controller and the plurality of auxiliary controllers is normal for a purpose of the voltage synchronization.

17. The voltage synchronization system according to claim 13, wherein the main controller is programmed to interrupt an operation when transmitting the voltage synchronization command to the plurality of auxiliary controllers is maintained for a first set time.

18. The voltage synchronization system according to claim 13, wherein the main controller is programmed to determine whether the voltage synchronization is possible with a highest priority for at least a second set time.

19. The voltage synchronization system according to claim 13, wherein each of the plurality of auxiliary controllers is programmed to determine whether receiving the transmitted voltage synchronization command is maintained for a third set time.

20. The voltage synchronization system according to claim 13, wherein each of the plurality of auxiliary controllers is programmed to:
  determine a range of correction of the voltages sensed by a corresponding auxiliary controller of the plurality of auxiliary controllers; and
  perform a voltage correction within the determined range of correction based on the output voltage of the fuel cell stack.

* * * * *